3,043,822
NEW POLYMERIZATION PROCESS
Arthur Maeder, Therwil, Switzerland, assignor to Ciba Limited, Basel, Switzerland
No Drawing. Filed July 21, 1958, Ser. No. 749,629
Claims priority, application Switzerland Aug. 1, 1957
20 Claims. (Cl. 260—89.7)

It is known to polymerize monomeric basic compounds containing a carbon-to-carbon double bond and a tertiary amino group or to copolymerize them with other compounds that likewise contain a carbon-to-carbon double bond.

In performing such reactions said basic compound was neutralized with an organic or inorganic acid and the reaction product was polymerized with the addition of a catalyst. Without the addition of acid—that is to say in the presence of a free tertiary amino group—it was as a rule very difficult or even impossible to bring about polymerization of said monomers, more especially so when the proportion of the basic polymerization component was more than 10% of the weight of the mixture of monomers.

It is also known that basic acrylamides, for example acrylic acid-γ-dimethylaminopropylamide, strongly inhibit the polymerization of acrylonitrile in solution so that only a small amount of a grey-brown polymer is formed. Complete replacement of oxygen by nitrogen in this polymerization does not produce an improvement.

The present invention is based on the observation that such basic monomers can be homopolymerized or copolymerized in a surprisingly simple and advantageous manner with the aid of catalysts in an organic or an aqueous medium when this reaction is conducted in the presence of acetylene.

The present invention provides a process for the manufacture of polymerization products by polymerizing compounds that contain at least one polymerizable carbon-to-carbon double bond and at least one tertiary amino group with the aid of polymerization catalysts, the polymerization being performed in the presence of acetylene.

The term "compounds that contain at least one polymerizable carbon-to-carbon double bond" refers to compounds containing the grouping >C=C< and preferably those containing the grouping $CH_2$=C< which are both homopolymerizable and copolymerizable, as well as to those which are only copolymerizable.

As such polymerizable compounds, whose molecule contains at least one tertiary amino group, are suitable those which belong to the following types of compounds:

(a) Basic amides or esters of aliphatic α:β-unsaturated di- or monocarboxylic acids,
(b) Basic vinyl ethers,
(c) Basic vinyl-heterocyclic compounds,
(d) Basic vinyl-aryl compounds and
(e) Allylamines containing a tertiary amino group The compounds belonging to class (a) are particularly suitable for use in the present process. Both for the homopolymerization—insofar as the monomers are homopolymerizable—and for the copolymerization there are preferably used from this group of compounds basic amides or basic esters of polymerizable aliphatic α:β-unsaturated monocarboxylic acids in whose molecule the amide or ester portion respectively contains a tertiary amino group. These basic amides and esters may be derived from any polymerizable or copolymerizable monocarboxylic acid such as crotonic acid, furylacrylic acid or α-chloracrylic acid or more especially from ethacrylic acid, methacrylic acid or acrylic acid, that is to say from an acid of the formula (1) 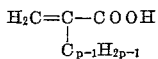

in which p is a whole number not exceeding 3.

These amides and esters correspond preferably to the general formula (2) 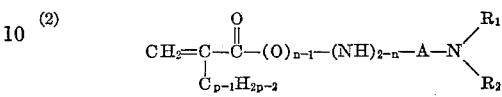

in which p is a whole number not exceeding 3; n is a whole number not exceeding 2; A is a hydrocarbon radical forming a bridge of at least 2 carbon atoms between the hetero atoms; and $R_1$ and $R_2$ represent unsubstituted or if desired substituted hydrocarbon radicals containing 1 to 6 carbon atoms, which may be linked to form a heterocyclic system. If n=1, the formula represents an amide of a copolymerizable acid, and when n=2 it represents a corresponding ester. The hydrocarbon radical A preferably contains 2 to 6 atoms, and it may be aliphatic or carboxylic; as examples of A may be mentioned the radical —$CH_2CH_2$—, $CH_2CH_2CH_2$— or

As examples of basic amides of Formula 2 may be mentioned:

Acrylic acid-γ-diethylaminopropylamide,
Methacrylic acid-γ-dimethylaminopropylamide,
Acrylic acid-γ-di-(hydroxyethyl)-aminopropylamide,
Methacrylic acid-β-diethylamino-ethylamide,
Acrylic acid-β-diethylamino-ethylamide,
Acrylic acid-β-dimethylamino-ethylamide,
Methacrylic acid-(4-dimethylamino-cyclohexyl)-amide,
Acrylic acid-(4-dimethylamino-phenyl)-amide,
Acrylic acid-β-N-morpholino-ethylamide and
Acrylic acid-β-pyrrolidino-ethylamide As examples of basic esters of Formula 2 may be mentioned:

Acrylic acid-β-diethylamino ethyl ester,
Acrylic acid-β-dimethylamino ethyl ester,
Methacrylic acid-γ-diethylamino propyl ester,
Acrylic acid-γ-di-(2-cyanoethyl)-amino propyl ester,
Acrylic acid-γ-di-n-butylamino propyl ester,
Acrylic acid-γ-diphenylamino propyl ester and
Acrylic acid-(4-diethylamino)-phenyl ester The specified amides can be prepared from any diamine containing a tertiary and an at most secondary amino group; as examples may be mentioned α-amino-β-diethylamino ethane, α-amino-γ-diethylamino propane, as well as diamines containing a higher aliphatic hydrocarbon radical such as are obtained by the additive combination of a higher secondary monoamine with acrylonitrile and subsequent reduction.

The specified esters may be prepared from any compound containing an esterifiable group (hydroxyl group) and a tertiary amino group, for example from tertiary alkanolamines such as dimethyl- or diethyl- or dibutyl-ethanolamine, dimethyl- or diethyl-propanolamine, N-methyl-N-stearyl-amino-propanolamine, or from heterocyclic compounds such as hydroxyethyl morpholine, or dimethylamino-hydroxybenzene.

Compounds likewise comprised in group (a) are basic amides or esters of aliphatic α:β-unsaturated dicarboxylic acids; these compounds are less suitable for the homopolymerization, but are preferably used for the copolymerization. As unsaturated dicarboxylic acids may be mentioned maleic acid, itaconic acid and more especially fumaric acid. Examples of such basic amides or esters are maleic acid-γ-dimethylamino-propylamide, fumaric acid-di-[γ-dimethylaminopropyl]-amide and fumaric acid-di-[β-diethylaminoethyl]-ester.

As examples of the basic vinyl ethers belonging to group (b) may be mentioned vinyl ethers containing a tertiary amino group, for example those which contain only one tertiary amino group and only aliphatic radicals; or those which contain only one tertiary amino group and, in addition to aliphatic radicals, only heterocyclic radicals, or only an aromatic radical containing a single, six-membered ring. In particular, there may be mentioned β-diethyl-aminoethyl vinyl ether, β-di-n-butylaminoethyl vinyl ether, β-morpholinoethyl vinyl ether and 4-dimethyl-aminophenyl-(1)-methyl vinyl ether.

Suitable basic vinyl heterocyclics comprised in group (c) are vinyl-imidazoles, vinyl-quinolines such as 2-vinyl-quinoline and more especially vinyl-pyridines such as α- or γ-vinyl-pyridine, γ- or δ-ethyl-α-vinyl-pyridine; furthermore N-vinyl-carbazole and N-(2-pyridino)-acrylamide.

Examples of the basic vinyl-aryl compounds mentioned sub (d) above are:

2-(dimethylamino)-styrene, 4-(dimethylamino)-styrene,
2-(diethylamino-styrene), 3-(diisopropylamino)-styrene,
4-(dimethylamino)-3-methylstyrene, 2:4-bis-(dimethyl-amino)-5-methylstyrene, 3-(dimethylamino)-α-methyl-styrene and
4-(N:N-dimethylamino-methyl)-styrene.

N:N-dimethylallylamine and N:N-diethylallylamine are preferred representatives of the compound comprised in group (e).

When the process of the invention is to be performed as a copolymerization, this may be done with the use of two or more different compounds of the composition defined above, or of at least one compound of this type and one or more other copolymerizable compounds, more especially such as likewise contain a carbon-to-carbon double bond, more especially an

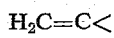

group, such as vinyl esters of organic acids, for example vinyl acetate, vinyl formate, vinyl butyrate, vinyl benzoate, as well as vinylalkyl ketones, vinyl halides such as vinyl chloride, vinyl fluoride, vinylidene chloride, vinyl-aryl compounds such as styrene and substituted styrenes; furthermore compounds of the acrylic acid series such as esters of acrylic acid and alcohols or phenols that are free from tertiary amino groups, e.g. ethyl acrylate, butyl acrylate, dodecyl acrylate, acrylonitrile or acrylamide and preferably its derivatives substituted at the amide nitrogen such as dihydroxyethyl-acrylamide, tertiary butyl-acryl-amide and hexamethylol-melamine triacrylamide; furthermore analogous derivatives of methacrylic acid, α-chlor-acrylic acid, crotonic acid, maleic acid or fumaric acid. There may also be used polymerizable olefines such as isobutylene, butadiene, 2-chlorobutadiene or heterocyclic compounds containing at least one vinyl group. Preferred use is made of derivatives of acrylic and methacrylic acid (which are free from basic nitrogen atoms) and among them more especially of esters with aliphatic alcohols, or N-monosubstituted amides in which an aliphatic substituent is linked to the amide nitrogen atom through a primary carbon atom.

The polymerization can be carried out in bulk, in solution or in emulsion with the use of the measures conventionally employed in polymerization technique. The polymerization is preferably performed in solution. Suitable polymerization catalysts are peroxidic compounds, for example peracetic acid, acetyl peroxide, benzoyl peroxide, benzoylacetyl peroxide, lauroyl peroxide, cumene hydroperoxide, tertiary butyl hydroperoxide, para-menthane hydroperoxide, hydrogen peroxide, percarbonates, persulfates or perborates. Catalysts of the "free radical" type are likewise suitable, such as α:α'-azodiisobutyronitrile or α:α-azobis-(isobutyroamidine hydrochloride). The amount of catalyst to be added depends in known manner on the desired progress of the reaction or on the properties the polymer is desired to possess. If desired, several polymerization catalysts may be applied together. The action of the polymerization catalysts can be further enhanced by a simultaneous application of heat. To enable the reaction rate of the polymerization and the molecular weight of the polymer to be varied, a so-called regulator—such, for example, as a mercaptan, terpene or the like—may be added.

It is also advantageous to perform the polymerization in the absence of air or oxygen, that is to say to use oxygen-free acetylene or a gas mixture containing oxygen-free acetylene. It is further possible to use in addition to the afore-mentioned catalysts and regulators so-called activators, for example inorganic oxidizable oxygen-containing sulfur compounds such as sulfur dioxide, sodium bisulfite, ammonium bisulfite, sodium hydrosulfite or sodium thiosulfate. The simultaneous presence of the afore-mentioned activators and the oxygen-yielding polymerization catalysts leads to the formation of a so-called Redox system which has a favourable influence on the progress of the polymerization. Suitable activators are also water-soluble aliphatic tertiary amines such as triethanolamine or diethyl-ethanolamine.

The polymerization according to the present process is performed in the presence of acetylene; the best and simplest manner consists in saturating the reaction mixture to be polymerized, for example the emulsion or solution, with acetylene gas and continuing the introduction of acetylene during the polymerization to ensure that the reaction mixture remains as saturated as possible. If desired, a gas mixture containing acetylene can be used instead of acetylene by itself.

There is thus a fundamental difference between the known process and the present process in which the polymerization is facilitated by neutralizing the reaction batch with an acid or by replacing the atmospheric oxygen by an inert gas. Viewed from the practical standpoint this means that basic polymers are obtained directly. When it is necessary to neutralize the polymer, the acid needed therefor can be chosen according to the individual purpose, irrespective of whether the acid used would also be suitable for the preceding polymerization proper.

The polymerization may be conducted at the ordinary temperature, though it is more advantageous to polymerize at an elevated temperature, for example at a temperature within the range of 40 to 95° C. or preferably of 55 to 90° C. The polymerization is often accompanied by the liberation of considerable amounts of heat so that suitable cooling means should be provided to enable the desired polymerization temperature to be maintained; this is particularly necessary when a large batch is to be polymerized in a single operation. To enable the liberated heat to be utilized and to facilitate regulation of the polymerization temperature, it has proved advantageous in some cases of emulsion polymerization or solution polymerization to start the polymerization with only a portion of the total emulsion or solution to be polymerized, allowing the polymerization to start in this portion. When the temperature in this portion of the emulsion or solution has reached a certain degree, for example 60 to 70° C., the remainder of the cold emulsion or solution is run in so that the polymerization temperature can be kept constant. It is often necessary to provide external heating towards the end of the polymerization.

When the polymerization is performed in an emulsion, it is of advantage to emulsify the monomers with the aid of an emulsifier, which may be of the cation-active or nonionic kind. Suitable cation-active emulsifiers are, for example, compounds of higher fatty amines with acetic acid, hydrochloric acid or sulfuric acid, such as octadecylamine acetate, (dodecyl)-diethyl-cyclohexylamine sulfate, as well as salts of diethylaminoethyl esters of higher fatty acids, or salts of the type of oleylamidoethyl-diethylamino acetate $C_{17}H_{33}CONHC_2H_4NH(C_2H_5)_2 \cdot OCOCH_3$. Further suitable are quaternary ammonium compounds such as cetyldimethylbenzyl-ammonium chloride, cetyltrimethyl-ammonium bromide, para-(trimethylammonium)benzoic acid cetyl ester methosulfate, cetylpyridinium methosulfate, octadecyltrimethyl-ammonium bromide or the quaternary compound from diethyl sulfate and triethanolamine tristearate.

From among the non-ionic emulsifiers may be mentioned the polyglycol ethers of higher fatty acids, fatty amines or fatty alcohols such as cetyl, oleyl or octadecyl alcohol, for example reaction products of 15 to 30 molecular proportions of ethylene oxide with 1 molecular proportion of the fatty alcohol. There may also be used emulsifiers having a pronounced cross-linking effect such as octylphenol polyglycol ethers, as well as lauryl alcohol polyglycol ethers or polyhydric alcohols partially esterified with higher fatty acids such, for example, as glycerol monolaurate or sorbitol monolaurate. There may also be used mixtures of several such emulsifiers, or mixtures of such emulsifiers with protective colloids, such as polyvinyl alcohols, partially hydrolyzed polyvinyl esters, as well as starch or starch derivatives, for example dextrin, and also cellulose ethers, polyethylene oxides, and quite generally mixtures with water-soluble polymers or copolymers containing free hydroxyl, amino or carbonamide groups. Finally, such protective colloids may also be used by themselves.

When the polymerization is performed in a solvent, the solvent used may be one in which only the monomers but not the polymers are soluble, or a solvent in which both the monomers and the polymers are soluble. Examples of suitable solvents are water or organic solvents such as aliphatic alcohols, acetone, methylene chloride, dichloroethane and benzene. The polymerization can be carried out with special advantage in a water-soluble solvent, preferably in lower aliphatic alcohols such as methanol, ethanol, propanol or isopropanol, or in a mixture of two or more such alcohols.

The polymerization is advantageously conducted at an elevated temperature, preferably at the boiling temperature of the solvent, and in the presence of a catalyst that is soluble in the reaction medium, such as lauroyl peroxide or $\alpha:\alpha'$-azodiisobutyronitrile.

According to the polymerization conditions and starting materials used, the polymers are obtained in the form of viscous solutions, of granulates or of emulsions. The product obtained by the polymerization can be further used as it is, though it is often preferable to process it first in a suitable manner. It may be mixed, for example, with modifying substances such as plasticizers, e.g. dibutyl phthalate or dioctyl phthalate or a sebacic acid ester, and organic or inorganic pigments or fillers may likewise be added. When the starting materials used are polymerizable and at the same time hardenable amides or esters, the polymerization and the hardening may be carried out separately, the material being first polymerized and then hardened. If desired, the two operations can alternatively be performed simultaneously. Hardenable amides are, for example, often readily accessible by the additive combination of formaldehyde with the appropriate non-hardenable amides.

The hardening is advantageously performed with the further addition of a hardening catalyst, such as one of the conventionally employed hardening catalysts, for example acids such as hydrochloric, sulfuric or formic acids; further suitable are salts of strong acids with weak bases, for example ammonium salts of strong inorganic or organic acids, such as ammonium chloride, ammonium sulfate, ammonium nitrite, ammonium oxalate or ammonium lactate. When the polymerization is performed in an organic solvent, a catalyst should be selected that is soluble in organic solvents, for example strong organic acids such as formic acid, acetic acid, chloracetic acid, or substances that yield an acid on being heated, such as tartaric acid diethyl ester or triacetine.

The polymers and copolymers obtained by the present process are suitable for a large variety of uses. Quite generally, they can be used wherever polymerization resins or polymerization and condensation resins are conventionally employed. Provided they have been prepared from appropriate starting material, the present products can be used, inter alia, as auxiliaries in the textile, leather and paper industries. They are suitable for impregnating and coating; for example, textiles from synthetic fibers—such as acetate rayon, polyamide fibers (nylon) or polyacrylonitrile fibers (Orlon)—can be provided with an antistatic dressing with suitably substituted compounds. Several polymers are also suitable as after-treatment agents for improving the fastness to washing and water of dyeings and prints produced on cellulosic textile materials with water-soluble direct dyestuffs whose solubility in water is caused by the presence of sulfonic acid groups or carboxylic groups. Such an after-treatment may also be combined with a treatment with a copper salt.

The polymers obtained by the present process are also suitable as fixing agents for soluble dyestuffs in photographic films; as binding agents for pigments; for animalizing fibers; as bonding agents for waxes and oils on paper and leather; as acid acceptors; as cationic precipitants; as stabilizers for polymers containing chlorine; in the form of the fluorosilicates as anti-moth agents; as thickening, emulsifying and sizing agents, and as adhesives. The polymers are also used with advantage as hardeners for epoxy resins.

The following examples illustrate the invention, parts and percentages being by weight.

*Example 1*

Acetylene is introduced for 10 minutes at room temperature into a solution of 150 parts of acrylic acid-$\gamma$-diethylaminopropylamide in 140 parts of distilled water contained in a reaction vessel of a capacity of 500 parts by volume provided with stirrer, reflux condenser and tube for introducing gas. The current of gas is then slightly reduced and the reaction mixture heated to a bath temperature of 70° C. When the temperature has become constant, a solution of 0.1 part of potassium persulfate in 2 parts of distilled water is added, whereupon polymerization sets in immediately and is evidenced by a substantial rise in temperature. ½ hour after the first addition of catalyst has been made, another 0.1 part of potassium persulfate in 2 parts of distilled water is added, and the same addition is repeated five more times at intervals of 1 hour each. After another hour the whole is cooled to room temperature.

297 parts are obtained of a highly viscous pale-yellow liquid which is almost clear at room temperature and has a resin content of 37.4%. Addition of water to this resin solution renders it strongly turbid, and when more water is added, the resin is precipitated. When dried, the resin is very tacky, colorless and clear and has an elasticity resembling that of rubber.

When a resin prepared in this manner was dried at 50° C. in vacuo until its weight remained constant and then kept for 48 hours in a vacuum desiccator over phosphorus pentoxide, its analysis revealed the following data: C=62.35%; H=10.89%; N=14.61%.

*Example 2*

A mixture of 40 parts of 4-vinylpyridine in 60 parts of benzene is introduced into a reaction vessel of a capacity of 250 parts by volume equipped with reflux condenser, thermometer and a tube for introducing acetylene, and a strong current of acetylene gas is passed through the mixture for 10 minutes at room temperature. The current of gas is then considerably reduced and the whole is heated to an internal temperature of 70° C., the current of gas being maintained during the whole of the polymerization process at the rate last adjusted. When the temperature has become constant, 0.1 part of α:α'-azodiisobutyronitrile is added. Polymerization sets in after a few minutes and is evidenced by the mixture turning turbid and its temperature rising from 70 to 78° C. At intervals of 3 hours each, calculated from the first addition of catalyst, another five additions of 0.1 part of α:α'-azodiisobutyronitrile each are made, and 3 hours after the last addition of catalyst the mixture is cooled to room temperature.

The resulting polymer precipitates as a hard, yellowish mass. The yield of polymer amounts to about 95% of theory.

Example 3

A mixture of 28 arts of β-diethylaminoethyl methacrylate, 12 parts of dihydroxyethyl methacrylamide and 60 parts of absolute alcohol is heated to an internal temperature of about 70° C. as described in Example 2. When the temperature has become constant, 0.1 part of α:α'-azodiisobutyronitrile is added and thereafter, at intervals of 4 hours each, this addition is repeated three more times. 7 hours after the last addition of catalyst the mixture is cooled to room temperature.

A yellowish, thinly viscous solution is obtained in which a gelatinous polymerizate is suspended.

Example 4

A mixture of 20 parts of crotonic acid-γ-dimethylaminopropylamide, 20 parts of n-butyl acrylate and 60 parts of acetone is heated to an internal temperature of about 60° C. as described in Example 1. When the temperature has become constant, 0.05 part of α:α'-azodiisobutyronitrile and 0.05 part of benzoyl peroxide are added, and this addition is repeated three more times at intervals of 5 hours each. 5 hours after the last addition of catalyst the mixture is cooled to room temperature.

The polymer so obtained forms a thinly liquid turbid solution.

Example 5

100 parts of N-dimethylaminoethyl vinyl ether are heated without the use of a solvent to an internal temperature of about 90° C. as described in Example 2. When the temperature has become constant, 0.4 part of α:α'-azodiisobutyronitrile and 0.4 part of lauroyl peroxide are added, and this addition is repeated nine more times at intervals of 2 hours each. 2 hours after the last addition of catalyst the mixture is cooled to room temperature.

A dark brown, thinly liquid oil is obtained.

Example 6

A mixture of 70 parts of acrylonitrile, 15 parts of vinylidene chloride, 15 parts of para-dimethylaminophenyl acrylamide and 150 parts of methylene chloride is heated to an internal temperature of about 50° C. as described in Example 2. When the temperature has become constant, 0.1 part of α:α'-axodiisobutyronitrile and 0.1 part of lauroyl peroxide are added, and this addition is repeated nine more times at intervals of 2 hours each. 2 hours after the last addition of catalyst the mixture is cooled to room temperature.

The polymer settles out as a soft lump of resin. The solvent is removed and the resin is once more washed with fresh methylene chloride and dried in a vacuum cabinet at 130° C., and then powdered to yield a beige colored powder.

5 parts of this powder are heated for 2 hours on a boiling water bath with 20 parts of a 0.5% aqueous solution of a dyestuff of the formula and 180 parts of distilled water, then cooled, suction-filtered, and the powder is washed on the filter with hot water until the filtrate has become colorless. The product is then dried in vacuo at 50° C.

Example 7

2.4 parts of lauroylamidopropyltrimethylammonium methosulfate are dissolved in 50 parts of distilled water, and 0.1 part of isooctanol, 33.6 parts of para-dimethylamino-styrene and 14.4 parts of fumaric acid-di-(γ-dimethylaminopropylamide) are added. The mixture is vigorously shaken and the resulting emulsion heated to an internal temperature of about 50° C. as described in Example 2. When the temperature has become constant, a solution of 0.05 part of potassium persulfate in 5 parts of distilled water is added. Polymerization sets in immediately and is evidenced by the temperature rising by about 5° C. When the temperature begins to drop again, the bath temperature is raised so that the internal temperature can be maintained at about 65° C. 2 hours after the first addition of catalyst another solution of 0.05 part of potassium persulfate in 5 parts of distilled water is added, and about ½ hour later the bath temperature is raised so that the internal temperature can be maintained at about 75° C. 3 hours after the second addition of catalyst the same amount of catalyst is added; this addition is repeated 3 hours later, and after another 3 hours the whole is cooled to room temperature.

A dark brown emulsion containing 42 to 43% of resin is obtained. The resin obtained therefrom by drying is insoluble in water.

Example 8

2.25 parts of lauroylamidopropyltrimethylammonium methosulfate are dissolved in 87 parts of distilled water, and 0.1 part of isooctanol, 9 parts of tertiary n-butyl acrylamide, 9 parts of N:N-dimethylallylamine and 27 parts of ethyl acrylate are added. The mixture is vigorously shaken and the resulting emulsion heated to an internal temperature of 60° C. as described in Example 2. When the temperature has become constant, a solution of 0.045 part of potassium persulfate in 4.5 parts of distilled water is added. After 1 hour the internal temperature is raised by 10° C. After another hour another solution of 0.045 part of potassium persulfate in 4.5 parts of distilled water is added, and this addition is repeated twice more at intervals of 2 hours each. 2 hours after the last addition of catalyst the mixture is cooled to room temperature.

The copolymer obtained in this manner displays properties resembling those of rubber and is soluble in alcohol, acetone, dioxane, dimethyl formamide and other solvents.

Example 9

18 parts of acrylic acid-γ-diethylamino-propylamide and 27 parts of hexamethylol-melamine triacrylamide are mixed with 87 parts of water and heated to an internal temperature of about 60° C. as described in Example 2. When the temperature has become constant, 0.045 part of potassium persulfate in 4.5 parts of water are added. After 1 hour the internal temperature is raised by 10° C. and after another hour again by 10° C. Another 0.045 part of potassium persulfate in 4.5 parts of water is then added, and this addition is repeated twice more at intervals of 2 hours each. 2 hours after the last addition of catalyst the mixture is cooled to room temperature.

A thick magma is obtained which is suctioned through a cloth filter. The filter cake is washed with about 100 parts by volume of distilled water.

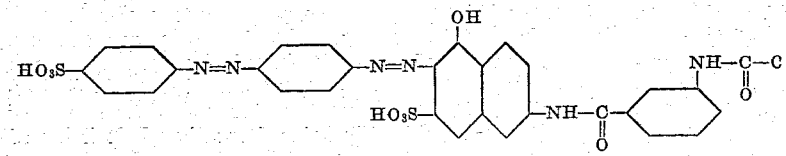

The filtrate is an orange-yellow clear solution containing about 13% of resin. After having been dried in vacuo at 130° C., the resin is a viscid, almost solid, yellowish mass which is readily soluble in water.

Example 10

A mixture of 21.6 parts of hexamethylolmelamine triacrylamide, 14.4 parts of N:N-dimethylallylamine and 84 parts of water is heated to an internal temperature of about 50° C. as described in Example 2. When the temperature has become constant, 0.09 part of potassium persulfate is added. After a short time the reaction temperature has risen to 59° C., whereupon another 0.09 part of potassium persulfate is added. Polymerization is continued for 2 hours, the internal temperature is raised to about 65° C., another 0.09 part of potassium persulfate is added, the mixture is diluted with 20 grams of absolute alcohol, and after another 1½ hours a least addition of 0.09 part of potassium persulfate is made. 30 minutes after the last addition of catalyst the internal temperature is raised to 80° C., polymerization is continued for 3 hours and the mixture is then cooled to room temperature.

The precipitated polymer is suctioned off and dried at 50° C. in vacuum cabinet, powdered, and yields a beige-colored powder which is insoluble in water and dilute acids.

Example 11

The following tests are carried out with the epoxy resins described below:

*Epoxy resin A.*—6 parts of a commercial polyvinyl alcohol containing acetate groups (a polyvinyl acetate hydrolyzed to about 88%, whose aqueous solution of 4% strength has a viscosity of 35 to 45 centipoises at 20° C.) are dissolved in 54 parts of water, and this solution is gradually treated in a homogenizer with 150 parts of a liquid polyglycidyl ether from epichlorohydrin and 4:4'-dihydroxydiphenyldimethyl methane containing 5.10 to 5.35 epoxide equivalents per kilogram in which previously, with gentle heating to 40° C., 2.6 parts of a condensation product from 1 molecular proportion of octadecyl alcohol and about 25 to 30 molecular proportions of ethylene oxide had been dissolved. A thickly salve-like, highly disperse emulsion is formed which is gradually diluted with 96 parts of water to produce a syrupy, stable emulsion having a dry content of 50%. Its pH value is 6.6.

*Epoxy resin B.*—A polyglycol ether from ethyleneglycol and epichlorohydrin containing 5.2 epoxide equivalents per kilogram.

*Epoxy resin C.*—An aliphatic polyglycidyl ether having a viscosity of 90 to 150 centipoises at 25° C. and containing 6.06 to 7.14 epoxide equivalents per kilogram.

*Epoxy resin D.*—A polyglycidyl ether from 1:4-butanediol and epichlorohydrin containing 7.68 epoxide equivalents per kilogram.

As shown in the following table, mixtures are prepared as described in Example 1 of the epoxy resins A, B, C and D with an aqueous polymer solution of 50% strength of acrylic acid-γ-diethylaminopropylamide. The percentages refer to the dry resin content, and the proportions indicated for making these mixtures produce optimum curing or cross-linking effects respectively.

| Poly-(acrylic acid-γ-diethyl-aminopropylamide) | Epoxy resin A | Epoxy resin B | Epoxy resin C | Epoxy resin D |
|---|---|---|---|---|
| (a) | 20 | 80 | | |
| (b) | 80 | | 20 | |
| (c) | 60 | | | 40 |
| (d) | 60 | | | 40 |
| (e) | 80 | | | 20 |

Specimens of the mixtures sub (a) to (e) above are brushed on to panes of glass, dried for 15 minutes at 90° C. and then cured for 10 minutes at 130° C.

The resulting coats have the following properties:

(a) Firmly adhering, non-tacky, colorless, matt resin; it is flexible and has excellent fastness to acetone and water;

(b) Moderately firmly adhering, soft, flexible resin, very fast to water and acetone;

(c) Moderately firmly adhering, colorless, clear, non-tacky, flexible resin, of good fastness to water and acetone;

(d) Moderately firmly adhering, flexible, almost non-tacky, pale yellowish resin which is very fast to water and acetone;

(e) Same as (d).

Example 12

Perfectly clear resin mixtures, which are colorless when hardened, particularly suitable for improving textiles, are obtained by using a copolymer from 20% of acrylic acid-γ-diethylaminopropylamide,
50% of tertiary butyl acrylamide and
30% of ethyl acrylate on the one hand and the epoxy resins A, B, C and D, mentioned in Example 11, on the other. This copolymer is prepared as described in the first paragraph of Example 8 and is obtained as a finely dispersed emulsion containing about 30% of resin when dried.

The following resin mixtures of optimum curing properties can be prepared. In the present case the basic copolymer serves as a suitable emulsifier for epoxy resins which can be directly incorporated with the aid of a homogenizer or rapid stirrer. The amounts used refer to the dry resin contents.

| Copolymer from acrylic acid-γ-diethyl-aminopropylamide + tertiary butyl acrylamide + ethyl acrylate (20:50:30) | Epoxy resin A | Epoxy resin B | Epoxy resin C | Epoxy resin D |
|---|---|---|---|---|
| (a) | 60 | 40 | | |
| (b) | 60 | | 40 | |
| (c) | 80 | | 20 | |
| (d) | 60 | | | 40 |
| (e) | 80 | | | 20 |
| (f) | 80 | | | | 20 |

After having been dried and cured for 10 minutes at 130° C., mixture (a) yields a slightly tacky, very firmly adhering coat which is very resistant to water and acetone.

Mixtures (b) and (c) yield flexible, clear and colorless coats which are insoluble in water and acetone.

Mixtures (d), (e) and (f) yield especially firmly adhering flexible, colorless, clear resin coats or dressings on any desired material, which are highly resistant to water and acetone. When applied in the form of a dilute aqueous liquor, they are also suitable for dressing textiles.

Resin mixtures particularly suitable as textile dressings are obtained by using as epoxy resin component an emulsion containing both epoxy resin A and epoxy resin D and, if desired, a $C_{16}$ to $C_{18}$ epoxy alkane. An emulsion of this latter type is advantageously prepared as described below:

A solution is prepared in a homogenizer from 6 parts of partially acetylated polyvinyl alcohol (see Example 11), 3 parts of a propyleneglycol ester of alginic acid, and 1.5 parts of a condensation product from 1 molecular proportion of nonylphenol and 9 molecular proportions of ethylene oxide in 141 parts of water. To this solution is added a mixture of 87 parts of epoxy resin D, 60 parts of epoxy resin A, and 3 parts of an olefin oxide containing 16 to 18 carbon atoms. The mixture is homogenized and finally 58.5 parts of water are added to form a syrupy, finely dispersed, stable emulsion.

In the manner described in this example, with the use of the above emulsion and the copolymer from acrylic acid-γ-diethylaminopropylamide, tertiary butyl acrylamide and ethyl acrylate, the mixtures described hereinbefore can be prepared, taking into consideration the dry contents of the emulsions.

The mixtures obtained in this manner are excellently suitable as agents for coating, printing or dressing textiles, leather or paper, and quite generally for producing coats which are flexible and resistant to water and organic solvents, such as acetone.

What is claimed is:

1. A process for the manufacture of polymers by polymerizing in a polymerization medium at least one monomer which contains one polymerizable carbon-to-carbon double bond and one to two basic tertiary amino groups, with the aid of a free radical-forming addition polymerization catalyst, which process comprises saturating the polymerization medium under atmospheric pressure with acetylene and polymerizing the monomer in free base state under atmospheric pressure, a stream of acetylene bubbling through the polymerization medium throughout the polymerization.

2. A process for the manufacture of polymer by polymerizing in a polymerization medium at least one monomer which contains one polymerizable carbon-to-carbon double bond and one to two basic tertiary amino groups, with the aid of a free radical-forming addition polymerization catalyst, which process comprises saturating the polymerization medium under atmospheric pressure with acetylene and polymerizing the monomer in free base state under atmospheric pressure, a stream of acetylene bubbling through the polymerization medium throughout the polymerization.

3. A process for the manufacture of copolymers by polymerizing in a polymerization medium at least one monomer which contains one polymerizable carbon-to-carbon double bond and one to two basic tertiary amino groups with at least one other polymerizable compound that contains one polymerizable carbon-to-carbon double bond and is free from basic tertiary amino groups, and with the aid of a free radical-forming addition polymerization catalyst, which process comprises saturating the polymerization medium under atmospheric pressure with acetylene and polymerizing the monomer in free base state under atmospheric pressure, a stream of acetylene bubbling through the polymerization medium throughout the polymerization.

4. A process for the manufacture of polymers by polymerizing in a polymerization medium at least one monomer which contains one polymerizable carbon-to-carbon double bond and one to two basic tertiary amino groups, with the aid of a free radical-forming addition polymerization catalyst, which process comprises carrying out the polymerization in solution and saturating the polymerization medium under atmospheric pressure with acetylene and polymerizing the monomer in free base state under atmospheric pressure, a stream of acetylene bubbling through the polymerization medium throughout the polymerization.

5. A process for the manufacture of polymers by polymerizing in a polymerization medium at least one monomer which contains one polymerizable carbon-to-carbon double bond and one to two basic tertiary amino groups, with the aid of a free radical-forming addition polymerization catalyst, which process comprises carrying out the polymerization in bulk and saturating the polymerization medium under atmospheric pressure with acetylene and polymerizing the monomer in free base state under atmospheric pressure, a stream of acetylene bubbling through the polymerization medium throughout the polymerization.

6. A process for the manufacture of polymers by polymerizing in a polymerization medium at least one monomer which contains one polymerizable carbon-to-carbon double bond and one to two basic tertiary amino groups, with the aid of a free radical-forming addition polymerization catalyst, which process comprises carrying out the polymerization in aqueous emulsion and saturating the polymerization medium under atmospheric pressure with acetylene and polymerizing the monomer in free base state under atmospheric pressure, a stream of acetylene bubbling through the polymerization medium throughout the polymerization.

7. A process for the manufacture of polymers with the aid of a free radical-forming addition polymerization catalyst by polymerizing in a polymerization medium at least one monomer containing one polymerizable carbon-to-carbon double bond and one to two basic tertiary amino groups and selected from the group consisting of amides from aliphatic $\alpha:\beta$-unsaturated carboxylic acids and diamines containing a tertiary and a primary amino group, esters from aliphatic $\alpha:\beta$-unsaturated carboxylic acids and amines containing a tertiary amino group and a hydroxyl group, basic vinyl ethers, basic vinyl-heterocyclic compounds, basic vinyl-aryl compounds and allyl-amines containing a tertiary amino group, which process comprises saturating the polymerization medium under atmospheric pressure with acetylene and polymerizing the monomer in free base state under atmospheric pressure, a stream of acetylene bubbling through the reaction medium throughout the polymerization.

8. A process for the manufacture of polymer with the aid of a free radical-forming addition polymerization catalyst by polymerizing in a polymerization medium, at least one monomer containing one polymerizable carbon-to-carbon double bond and one to two basic tertiary amino groups and selected from the group consisting of amides from aliphatic $\alpha:\beta$-unsaturated carboxylic acids and diamines containing a tertiary and a primary amino group, esters from aliphatic $\alpha:\beta$-unsaturated carboxylic acids and amines containing a tertiary amino group and a hydroxyl group, basic vinyl ethers, basic vinyl-heterocyclic compounds, basic vinyl-aryl compounds and allyl-amines containing a tertiary amino group, which process comprises saturating the polymerization medium under atmospheric pressure with acetylene and polymerizing the monomer in free base state under atmospheric pressure, a stream of acetylene bubbling through the polymerization medium throughout the polymerization.

9. A process for the manufacture of copolymers with the aid of a free radical-forming addition polymerization catalyst by polymerizing in a polymerization medium at least one monomer containing one polymerizable carbon-to-carbon double bond and one to two basic tertiary amino groups, the monomer being selected from the group consisting of amides from aliphatic $\alpha:\beta$-unsaturated carboxylic acids and diamines containing a tertiary and a primary amino group, esters from aliphatic $\alpha:\beta$-unsaturated carboxylic acids and amines containing a tertiary amino group and a hydroxyl group, basic vinyl ethers, basic vinyl-heterocyclic compounds, basic vinyl-aryl compounds and allyl-amines containing a tertiary amino group, with at least one other polymerizable compound that contains one polymerizable carbon-to-carbon double bond and is free from tertiary amino groups, which process comprises saturating the polymerization medium under atmospheric pressure with acetylene and polymerizing the monomer in free base state under atmospheric pressure, a stream of acetylene bubbling through the polymerization medium throughout the polymerization.

10. A process as claimed in claim 9, wherein the basic compound containing the tertiary amino group is polymerized with acrylonitrile.

11. A process for the manufacture of polymers with the aid of a free radical-forming addition polymerization catalyst by polymerizing in a polymerization medium at least one monomer containing one polymerizable carbon-to-carbon double bond, containing one to two basic tertiary amino groups and selected from the group consisting of amides from aliphatic $\alpha:\beta$-unsaturated carboxylic acids and diamines containing a tertiary and a primary amino group, esters from aliphatic $\alpha:\beta$-unsaturated carboxylic acids and amines containing a tertiary amino group and a hydroxyl group, basic vinyl ethers, basic vinyl-heterocyclic compounds, basic vinyl-aryl compounds and allyl-amines containing a tertiary amino group, which process comprises carrying out the polymerization in solution and saturating the polymerization medium under atmospheric pressure with acetylene and polymerizing the monomer in free base state under atmospheric pressure, a stream of acetylene bubbling through the polymerization medium throughout the polymerization.

12. A process for the manufacture of polymers in a polymerization medium with the aid of a free radical-forming addition polymerization catalyst by polymerizing at least one monomer containing one polymerizable carbon-to-carbon double bond and one to two basic tertiary amino groups, the monomer being selected from the group consisting of (a) amides from aliphatic α:β-unsaturated carboxylic acids and diamines containing a tertiary and a primary amino group, (b) esters from aliphatic α:β-unsaturated carboxylic acids and amines containing a tertiary amino group and a hydroxyl group, (c) basic vinyl esters, (d) basic vinyl-heterocyclic compounds, (e) basic vinyl-aryl compounds and (f) allyl-amines containing a tertiary amino group, which process comprises carrying out the polymerization in bulk and saturating the polymerization medium under atmospheric pressure with acetylene and polymerizing the monomer in free base state under atmospheric pressure, a stream of acetylene bubbling through the polymerization medium throughout the polymerization.

13. A process for the manufacture of polymers in a polymerization medium with the aid of a free radical-forming addition polymerization catalyst by polymerizing at least one monomer containing one polymerizable carbon-to-carbon double bond and one to two basic tertiary amino groups, which monomer is selected from the group consisting of (a) amides from aliphatic α:β-unsaturated carboxylic acids and diamines containing a tertiary and a primary amino group, (b) esters from aliphatic α:β-unsaturated carboxylic acids and amines containing a tertiary amino group and a hydroxyl group, (c) basic vinyl ethers, (d) basic vinyl-heterocyclic compounds, (e) basic vinyl-aryl compounds and (f) allyl-amines containing a tertiary amino group, which process comprises carrying out the polymerization in aqueous emulsion and saturating the polymerization medium under atmospheric pressure with acetylene and polymerizing the monomer in free base state under atmospheric pressure, a stream of acetylene bubbling through said polymerization medium throughout the polymerization.

14. A process for the manufacture of polymers in a polymerization medium with the aid of a free radical-forming addition polymerization catalyst by polymerizing at least one monomer of the formula

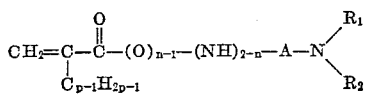

in which p is an integer of at least 1 and at most 3; n is an integer of at least 1 and at most 2; A represents a hydrocarbon radical which forms a bridge of at least 2 carbon atoms between the hetero atoms; and $R_1$ and $R_2$ represent radicals selected from the group consisting of unsubstituted hydrocarbon radicals containing 1 to 6 carbon atoms, hydroxy substituted hydrocarbon radicals containing 1 to 6 carbon atoms, cyano substituted hydrocarbon radicals containing 1 to 6 carbon atoms, alicyclic and heterocyclic radicals, which process comprises saturating the polymerization medium under atmospheric pressure with acetylene and polymerizing the monomer in free base state under atmospheric pressure, a stream of acetylene bubbling through said polymerization medium throughout the polymerization.

15. A process for the manufacture of polymer in a polymerization medium with the aid of a free radical-forming addition polymerization catalyst by polymerizing at least one monomer of the formula

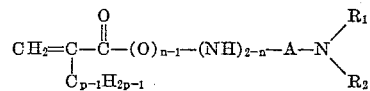

in which p is an integer of at least 1 and at most 3; n is an integer of at least 1 and at most 2; A is a hydrocarbon radical which forms a bridge of at least 2 carbon atoms between the hetero atoms; and $R_1$ and $R_2$ represent radicals selected from the group consisting of unsubstituted hydrocarbon radicals containing 1 to 6 carbon atoms, hydroxy substituted hydrocarbon radicals containing 1 to 6 carbon atoms, cyano substituted hydrocarbon radicals containing 1 to 6 carbon atoms, alicyclic and heterocyclic radicals, which process comprises saturating the polymerization medium under atmospheric pressure with acetylene and polymerizing the monomer in free base state under atmospheric pressure, a stream of acetylene bubbling through the polymerization medium throughout the polymerization.

16. A process for the manufacture of copolymers in a polymerization medium with the aid of a free radical-forming addition polymerization catalyst by polymerizing at least one monomer of the formula

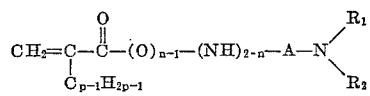

in which p is an integer of at least 1 and at most 3; n is an integer of at least 1 and at most 2; A is a hydrocarbon radical which forms a bridge of at least 2 carbon atoms between the hetero atoms; and $R_1$ and $R_2$ represent radicals selected from the group consisting of unsubstituted hydrocarbon radicals containing 1 to 6 carbon atoms; hydroxy substituted hydrocarbon radicals containing 1 to 6 carbon atoms, cyano substituted hydrocarbon radicals containing 1 to 6 carbon atoms, alicyclic and heterocyclic radicals, with at least one other polymerizable compound that contains one polymerizable carbon-to-carbon double bond and is free from basic tertiary amino groups, which process comprises saturating the polymerization medium under atmospheric pressure with acetylene and polymerizing the monomer in free base state under atmospheric pressure, a stream of acetylene bubbling through said polymerization medium throughout the polymerization.

17. A process as claimed in claim 16 wherein the compound containing the tertiary amino group is polymerized with N-tertiary butylacrylamide.

18. A process for the manufacture of polymers in a polymerization medium with the aid of a free radical-forming addition polymerization catalyst by polymerizing at least one monomer of the formula

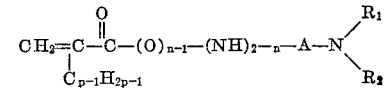

in which p is an integer of at least 1 and at most 3; n is an integer of at least 1 and at most 2; A is a hydrocarbon radical which forms a bridge of at least 2 carbon atoms between the hetero atoms; and $R_1$ and $R_2$ represent radicals selected from the group consisting of unsubstituted hydrocarbon radicals containing 1 to 6 carbon atoms, hydroxy substituted hydrocarbon radicals containing 1 to 6 carbon atoms, cyano substituted hydrocarbon radicals containing 1 to 6 carbon atoms, alicyclic and heterocyclic radicals, which process comprises carrying out the polymerization in solution and saturating the polymerization medium under atmospheric pressure with acetylene and polymerizing the monomer in free base state under atmospheric pressure, a stream of acetylene bubbling through said polymerization medium throughout the polymerization.

19. A process for the manufacture of polymers in a polymerization medium with the aid of a free radical-forming addition polymerization catalyst by polymerizing at least one monomer of the formula

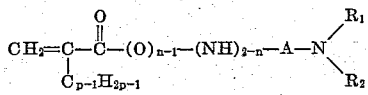

in which $p$ is an integer of at least 1 and at most 3; $n$ is an integer of at least 1 and at most 2; A is a hydrocarbon radical which forms a bridge of at least 2 carbon atoms between the hetero atoms; and $R_1$ and $R_2$ represent radicals selected from the group consisting of unsubstituted hydrocarbon radicals containing 1 to 6 carbon atoms, hydroxy substituted hydrocarbon radicals containing 1 to 6 carbon atoms, cyano substituted hydrocarbon radicals containing 1 to 6 carbon atoms, alicyclic and heterocyclic radicals, which process comprises carrying out the polymerization in bulk and saturating the polymerization medium under atmospheric pressure with acetylene and polymerizing the monomer in free base state under atmospheric pressure, a stream of acetylene bubbling through said polymerization medium throughout the polymerization.

20. A process for the manufacture of polymers in a polymerization medium with the aid of a free radical-forming addition polymerization catalyst by polymerizing at least one monomer of the formula

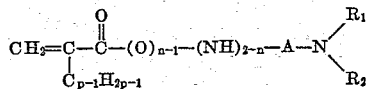

in which $p$ is an integer of at least 1 and at most 3; $n$ is an integer of at least 1 and at most 2; A represents a hydrocarbon radical which forms a bridge of at least 2 carbon atoms between the hetero atoms; and $R_1$ and $R_2$ represent radicals selected from the group consisting of unsubstituted hydrocarbon radicals containing 1 to 6 carbon atoms, hydroxy substituted hydrocarbon radicals containing 1 to 6 carbon atoms, cyano substituted hydrocarbon radicals containing 1 to 6 carbon atoms, alicyclic and heterocyclic radicals, which process comprises carrying out the polymerization in aqueous emulsion and saturating the polymerization medium under atmospheric pressure with acetylene and polymerizing the monomer in free base state under atmospheric pressure, a stream of acetylene bubbling through said polymerization medium throughout the polymerization.

References Cited in the file of this patent
UNITED STATES PATENTS

| | | |
|---|---|---|
| 2,093,749 | Derby | Sept. 21, 1937 |
| 2,419,008 | Coffman et al. | Apr. 15, 1947 |
| 2,443,005 | Jacobson | June 8, 1948 |
| 2,595,907 | Thomas et al. | May 6, 1952 |
| 2,628,224 | Cairns et al. | Feb. 10, 1953 |
| 2,657,200 | McGrew et al. | Oct. 27, 1953 |

OTHER REFERENCES

Reepe et al.: Ann. der Chemie, vol. 601, pages 128–38 (1956).

UNITED STATES PATENT OFFICE
CERTIFICATE OF CORRECTION

Patent No. 3,043,822                                    July 10, 1962

Arthur Maeder

It is hereby certified that error appears in the above numbered patent requiring correction and that the said Letters Patent should read as corrected below.

Column 7, line 16, for "arts" read -- parts --; line 57, for "axodiisobutyronitrile" read -- azodiisobutyronitrile --; lines 70 to 75, for the right-hand end of the formula reading:

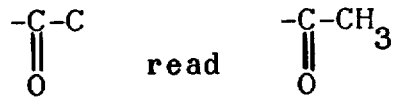

column 9, line 18, for "least" read -- last --.
    Signed and sealed this 3rd day of September 1963.

(SEAL)
Attest:

ERNEST W. SWIDER
Attesting Officer

DAVID L. LADD
Commissioner of Patents